United States Patent [19]

Fukushima

[11] Patent Number: 5,235,429
[45] Date of Patent: Aug. 10, 1993

[54] DISPLAY APPARATUS HAVING BANDWIDTH REDUCTION AND VERTICAL INTERPOLATION

[75] Inventor: Nobuo Fukushima, Nagasaki, Japan

[73] Assignee: Mitsubishi Denki Kabushiki Kaisha, Tokyo, Japan

[21] Appl. No.: 840,313

[22] Filed: Feb. 24, 1992

[30] Foreign Application Priority Data

Feb. 28, 1991 [JP] Japan .................. 3-58172

[51] Int. Cl.$^5$ .............. H04N 3/12; H04N 7/01; H04N 5/66
[52] U.S. Cl. .................. 358/230; 358/56; 358/168
[58] Field of Search ............ 358/168, 230, 56, 59, 358/236, 133; 340/784, 793, 781

[56] References Cited

U.S. PATENT DOCUMENTS

| | | | |
|---|---|---|---|
| 4,006,298 | 2/1977 | Fowler et al. | 358/240 |
| 4,021,607 | 6/1977 | Amano | 358/230 |
| 4,031,541 | 6/1977 | Arisawa et al. | 358/56 |
| 4,194,215 | 3/1980 | Shionoya | 358/230 |
| 4,498,081 | 2/1985 | Fukushima et al. | 340/793 |
| 5,166,801 | 11/1992 | Yoshikawa | 358/230 |

FOREIGN PATENT DOCUMENTS

| | | |
|---|---|---|
| 0181174 | 5/1986 | European Pat. Off. |
| 0400286 | 12/1990 | European Pat. Off. |
| 145974 | 6/1987 | Japan |
| 145975 | 6/1987 | Japan |

OTHER PUBLICATIONS

*Patent Abstracts of Japan*, vol. 4, No. 036, (JP 55-008158), Mar. 1980.

Primary Examiner—James J. Groody
Assistant Examiner—Glenton B. Burgess
Attorney, Agent, or Firm—Burns, Doane, Swecker & Mathis

[57] ABSTRACT

The display apparatus has a band-pass filter for limiting an input video signal to a bandwidth equal to or narrower than half of a frequency band which is calculated from the number of display elements along the horizontal direction of a screen. Further a computing circuit computes vertical interpolation video data in order to correct for the difference between the number of display elements along the vertical direction and the number of scanning lines along the vertical direction of the input video signal. Even if various kinds of video signals are input, the display apparatus displays images corresponding to the video signals, by controlling the brightness of display elements arranged in a matrix form.

16 Claims, 3 Drawing Sheets

DISPLAY APPARATUS HAVING BANDWIDTH REDUCTION AND VERTICAL INTERPOLATION

BACKGROUND OF THE INVENTION

1. Field of the Invention

This invention relates to a display apparatus in which a large number of display elements such as luminescent cells or cells for controlling light intensity are arranged in a matrix form, and which displays images, characters, graphics or the like.

2. Description of Related Art

FIG. 1 is a block diagram illustrating the configuration of a typical example of such a display apparatus which is disclosed in U.S. Pat. No. 4,498,081.

The display apparatus of FIG. 1 will be described. At first, an analog composite video signal 1 is inputted to a synchronizing separator circuit 2A. This synchronizing separator circuit 2A separates from the composite video signal 1 a horizontal synchronizing signal and a vertical synchronizing signal which are in turn supplied to a write control circuit 4. A chrominance demodulator circuit 2B independently separates luminance signals for red, green and blue from a separated video signal and outputs them in the form of analog signals to an A/D (analog to digital) converter 3. The A/D converter 3 generates a digital signal for each color in accordance with the corresponding luminance signal. A data multiplexer 5 which receives these digital signals selects one of them successively according to the color arrangement of cathode ray tubes 21 on a display board. The selected digital signals are transferred as the write data to a data latch circuit 6 as they are, and temporarily latched therein until the timing of writing data into a video data memory 8 occurs.

In accordance with the input synchronizing signal, the write control circuit 4 generates a signal for specifying an address in the video data memory 8, i.e., a memory write address signal, and sends it to an address multiplexer 7. The address multiplexer 7 receives a signal from a memory read and write controller 14 which is adapted to set the time sharing of the write period and the read period of each of the video data memory 8, a graphic data memory 9 and a blanking data memory 10, and in response to this signal sends the memory write address signal to the video data memory 8 only during the write period, thereby storing the latched write data into a desired address.

The video data memory 8 comprises a RAM (random access memory) having memory elements the number of which corresponds to the number of ray tubes 21 arranged in a matrix form on the display board. In the video data memory 8, the data are written in positions corresponding to the respective memory write address signals. Similarly, characters and graphics are displayed by using the graphic data memory 9 corresponding to the video data memory 8, and characters or the like are displayed by blanking video signals from the video data memory 8 with data from the blanking data memory 10.

On the other hand, only a particular region of the display board is controlled by using a video mode memory 11, a graphic mode memory 12 and a blanking mode memory 13, so that, in one or more specified areas of the particular region, data from the video data memory 8, the graphic data memory 9 or the blanking data memory 10 are locked. Data from the video mode memory 11 are supplied through an OR circuit 31 to an inhibit terminal of an AND circuit 32, so that data from the video data memory 8 which correspond to an area set by a data processor 16 are locked to the video mode memory 11. Data from the graphic mode memory 12 are supplied to an inhibit terminal of an AND circuit 30, so that data from the graphic data memory 9 which correspond to an area set by the graphic mode memory 12 are locked. Data from the blanking mode memory 13 are supplied to an inhibit terminal of an AND circuit 29, so that data from the blanking data memory 10 which correspond to an area set by the blanking mode memory 13 are locked.

These locking operations can be carried out individually or together depending upon the mode of an automatic-manual switching circuit 17 which is set to the manual mode or the automatic mode. In all the memories 9, 10, 11, 12 and 13 other than the video data memory 8, addresses are specified externally as desired by the data processor 16 and data are written therein with the same timing as that employed for the video data memory 8.

Data read out from the video data memory 8, graphic data memory 9 and blanking data memory 10 are supplied through an OR circuit 33 to a data comparator 18.

A display set and reset address generating circuit 15 receives a timing signal from the memory read and write controller 14, and generates an address signal for reading data from a memory which is in turn supplied to the address multiplexer 7. Upon receiving the timing signal from the memory read and write controller 14, the address multiplexer 7 opens its gate for a predetermined read period. In this operation, reading address signals are supplied to the video data memory 8, and the reading operation is carried out.

Using these reading address signals, all the memory elements of the video data memory 8 are sequentially addressed so that all stored data are read out. When signals are to be read out from the graphic data memory 9 and blanking data memory 10, reading address signals for each of the memories 9 and 10 are supplied in the same manner as the above at every predetermined read period to the address multiplexer 7.

In synchrony with the timing signal from the memory read and write controller 14, the display set and reset address generating circuit 15 supplies "on" discriminating comparison data for the cathode ray tube 21 to the data comparator 18. The data comparator 18 sequentially compares read-out data with the comparison data of each step, and outputs "on" and "off" signals to a data latch circuit 19 according to the levels of the read-out signals.

In response to these signals, column drive circuits 23 are driven to control the brightness of the cathode ray tubes 21. More specifically, a D-type flip-flop 20 is coupled to the cathode of each of the cathode ray tubes 21 through a transistor 22, and the output of the respective column drive circuit 23 is inputted to the data input terminals D of the flip-flops 20. The display set and reset address generating circuit 15 generates an address signal and a set signal, and the set signal is received by a set address discriminating circuit 24 corresponding to the address. The set signal is outputted from a line drive circuit 25 of the corresponding line to the terminals T of the flip-flops 20 which are coupled to the cathode ray tubes 21 in the corresponding line. According to the set signal, these flip-flops 20 are set so that the corresponding cathode ray tubes 21 are turned on or off. Furthermore, the display set and reset address generating circuit 15 also generates an address signal and a reset signal, and the reset signal is received by a reset address discriminating circuit 26 corresponding to the address. The reset signal is outputted from a line drive circuit 27 of the corresponding line to the reset terminals of the flip-flops 20, thereby resetting these flip-flops 20.

If the time interval between the generation of the set signal and the generation of the reset signal is constant, then the brightness of each cathode ray tube 21 corresponds to the data supplied from the data comparator 18. The brightness of the each cathode ray tube 21, i.e., the brightness of the entire screen of the display board can be controlled by changing the time interval between the generation of the two signals.

Graphic data read out from the graphic data memory 9 are supposed on video data through the OR circuit 33, and graphics are displayed on the screen. Since data read out from the blanking data memory 10 are inputted to the inhibit terminal of the AND circuit 32 through the AND circuit 29 and OR circuit 31, video data are blanked in accordance with the blanking data.

Today, in addition to standardized video signals according to NTSC, PAL, SECAM, etc., various video signals produced by computer systems are used. Such video signals including standardized video signals are different in form such as the number of scanning lines. Therefore, it is very difficult for one display apparatus in which display elements are fixedly arranged in a matrix form to reproduce all kinds of video signals.

When the frequency band of a video signal is F, a horizontal display period is $T_H$, and a vertical display period is $T_V$, the numbers m and n of vertical and horizontal display elements required for reproducing the video signal are $T_V/T_H$ and $F \cdot T_H$, respectively ($m = T_V/T_H$ and $n = F \cdot T_H$). If a display apparatus has a screen consisting of M number of display elements along the horizontal direction and N number of display elements along the vertical direction, the original video signal can principally be reproduced in a case that $M > m$ and $N > n$. A prior art display apparatus is not provided with signal interpolation means for interpolating video signals along the horizontal and vertical directions. Therefore, the prior art display apparatus in which $M < m$ and $N < n$ has a problem in that the original video signal cannot be correctly reproduced.

SUMMARY OF THE INVENTION

It is the principal object of the invention to provide a display apparatus which can correctly display any kind of video signal.

It is another object of the invention to provide a display apparatus in which the abilities of a screen can be exhibited fully, thereby allowing any kind of video signal to be correctly reproduced.

The display apparatus according to the invention comprises: a selection circuit for selecting one of a plurality of input video signals; a band-pass filter for limiting the selected video signal to a frequency bandwidth equal to or narrower than the half of a frequency band which is calculated on the basis of the number of display elements along the horizontal direction of a screen; and a computing circuit for computing vertical interpolation video data in order to correct for the difference between the number of display elements along the vertical direction and the number of scanning lines along the vertical direction of the selected video signal.

In the display of video signals in the present display apparatus, the partial omission of reproducing video signals along the horizontal direction is prevented from occurring by the filtering effect of the band-pass filter. Furthermore, the partial omission of reproducing video signals along the vertical direction is prevented from occurring by displaying an image while controlling each display element of the screen in accordance with the computed vertical interpolation video data.

The above and further objects and features of the invention will more fully be apparent from the following detailed description with accompanying drawings.

DESCRIPTION OF THE PREFERRED EMBODIMENTS

The present invention will be described with reference to the drawings illustrating embodiments.

Figure 1:
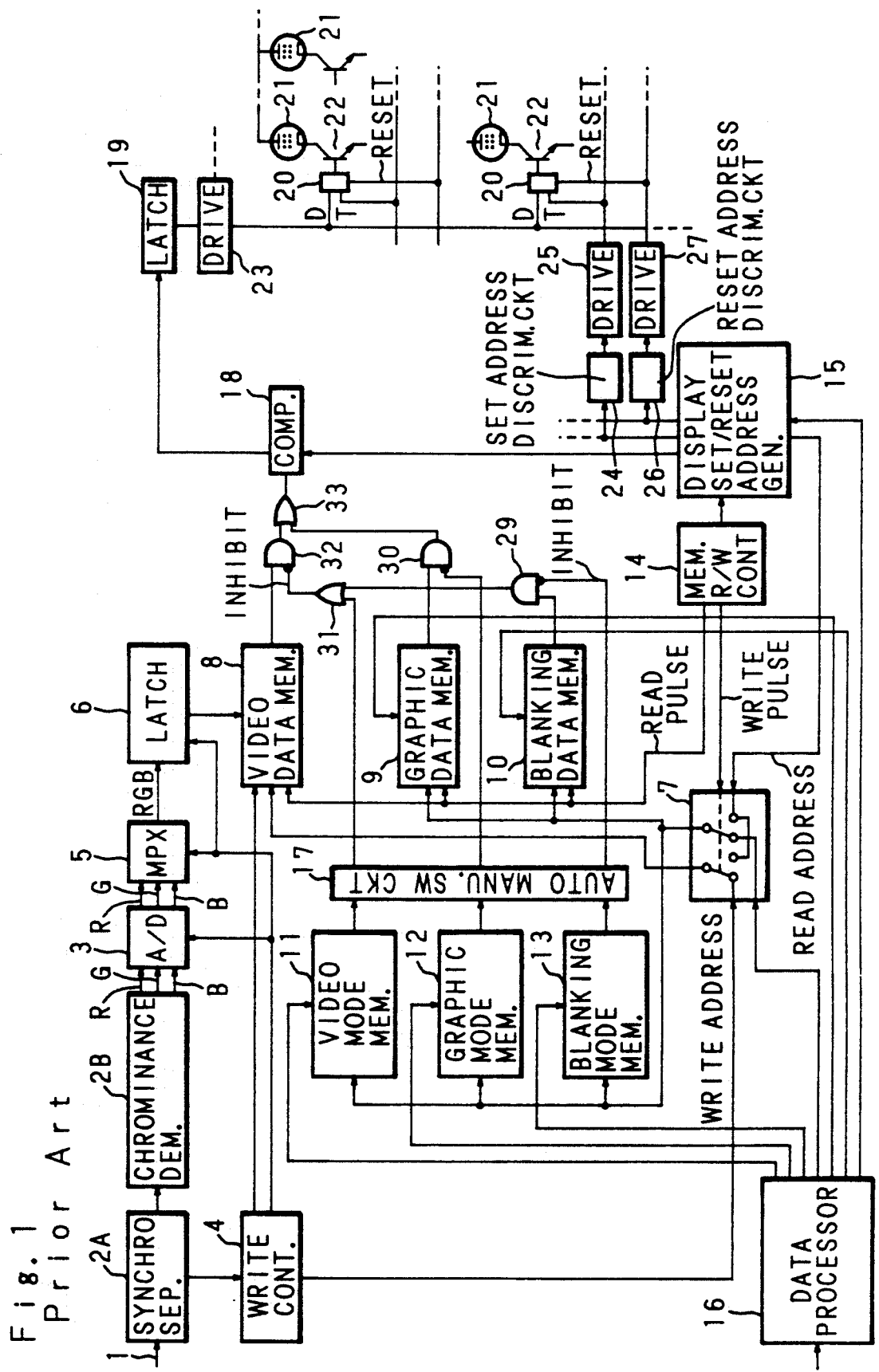
FIG. 1 is a block diagram illustrating the configuration of a prior art display apparatus.
Figure 2:
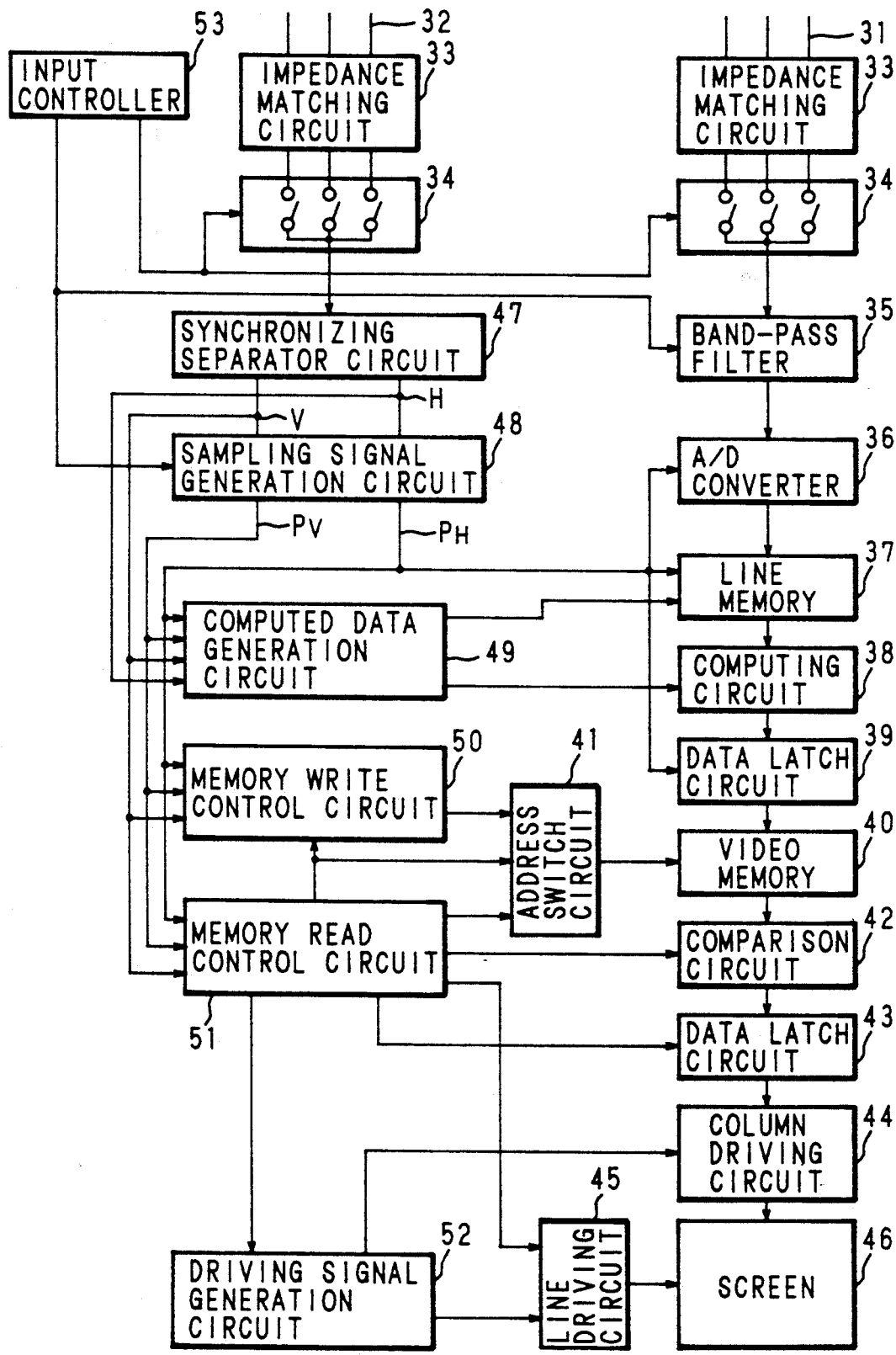
FIG. 2 is a block diagram illustrating the configuration of a display apparatus according to the invention.

FIG. 2 is a block diagram illustrating the configuration of a display apparatus according to the invention. In the figure, 31 and 32 respectively indicate video signal input terminals to which a plurality of video signals are inputted, and composite synchronizing signal input terminals to which composite synchronizing signals corresponding to the video signals are inputted. Video signals are supplied through the input terminals 31 and an impedance matching circuit 33 to a signal switch circuit 34. One of the input video signals is selected by the signal switch circuit 34, and inputted to a band-pass filter 35. Composite synchronizing signals are supplied through the input terminals 32 and another impedance matching circuit 33 to another signal switch circuit 34. One of the input composite synchronizing signals is selected by the signal switch circuit 34, and inputted to a synchronizing separator circuit 47. These selections of input signals are controlled by an input controller 53.

The band-pass filter 35 limits the input video signal to a frequency bandwidth equal to or narrower than the half of a frequency calculated from the number (M) of display elements along the horizontal direction which are arranged in a matrix form on a screen 46, and then supplies the video signal to an A/D converter 36. The synchronizing separator circuit 47 separates the input composite synchronizing signal into a horizontal synchronizing signal H and a vertical synchronizing signal V. The horizontal synchronizing signal H is sent to a sampling signal generation circuit 48 and a computed data generation circuit 49. The vertical synchronizing signal V is supplied to the sampling signal generation circuit 48, the computed data generation circuit 49, a memory write control circuit 50 and a memory read control circuit 51.

On the basis of data indicative of the horizontal display period ($T_H$) from the input controller 53 and the number M of display elements along the horizontal direction which has been previously set, the sampling signal generation circuit 48 generates a sampling pulse $P_H$ which is synchronized and coincident in phase with the horizontal synchronizing signal H and which has a frequency of $M/T_H$. The sampling pulse $P_H$ is supplied to the A/D converter 36, a line memory 37, a data latch circuit 39, the computed data generation circuit 49, the memory write control circuit 50 and the memory read control circuit 51. Furthermore, on the basis of data indicative of the vertical display period ($T_V$) from the input controller 53 and the number (N) of display elements along the vertical direction of the screen 46 which has been previously set, the sampling signal generation circuit 48 also generates a pulse $P_V$ which is synchronized and coincident in phase with the vertical synchronizing signal V and which has a frequency of $N/T_V$. The pulse $P_V$ is supplied to the computed data generation circuit 49, the memory write control circuit 50 and the memory read control circuit 51.

The A/D converter 36 performs A/D conversion of the input video signal at the timing of the sampling pulse $P_H$, and the resulting digital video signal is supplied to the line memory 37. The line memory 37 temporarily stores input data. The combination of the line memory 37, the computed data generation circuit 49 and a computing circuit 38 conducts the interpolation computing in the manner described below. The computed result is temporarily stored by the data latch circuit 39.

The memory write control circuit 50 generates a memory write address on the basis of the vertical synchronizing signal V, the pulse $P_V$ and the sampling pulse $P_H$, and outputs it to an address switch circuit 41. The memory read control circuit 51 generates a memory read address on the basis of the vertical synchronizing signal V, the pulse $P_V$ and the sampling pulse $P_H$, and outputs it to the address switch circuit 41. Video data from the data latch circuit 39 are written into a video memory 40 in accordance with the memory write address from the address switch circuit 41. Video data are read out from the video memory 40 in accordance with the memory read address from the address switch circuit 41, and the read out video data are sent to a comparison circuit 42.

In the comparison circuit 42, weight data is previously set. The comparison circuit 42 compares the video data read out from the video memory 40 with this weight data, and sends M number of data indicative of illumination or non-illumination of a display element to a data latch circuit 43 which in turn temporarily stores these data. The memory read control circuit 51 outputs a driving trigger pulse to a driving signal generation circuit 52. The driving signal generation circuit 52 supplies a driving voltage required for lighting to a line driving circuit 45 and a column driving circuit 44. The line and column driving circuits 45 and 44 control "on" and "off" of each of the M×N display elements of the screen 46.

The operation of the display apparatus of the invention having the above-described configuration will be described.

The signal switch circuits 34, 34 select one of the video signals and one of the composite synchronizing signals which corresponds to the selected video signal, under the control of the output of the input controller 53. The selected video signal is limited by the band-pass filter 35 to the frequency bandwidth equal to or narrower than half of the signal band $M/T_H$. The video signal is then sent to the A/D converter 36. In contrast, the selected composite synchronizing signal is sent to the synchronizing separator circuit 47, and separated into the horizontal synchronizing signal H and the vertical synchronizing signal V. The sampling signal generation circuit 48 generates a sampling pulse $P_H$ of a frequency of $M/T_H$ on the basis of the horizontal display period $T_H$ and the horizontal-display element number M, and also the pulse $P_V$ of a frequency of $N/T_V$ on the basis of the vertical display period $T_V$ and the vertical-display element number N.

The video signal inputted to the A/D converter 36 is converted into a digital signal at the timing of the sampling pulse $P_H$, and thereafter temporarily stored in the line memory 37 in the unit of one horizontal line to be used in the later vertical interpolation computing.

The interpolation computing conducted by the computed data generation circuit 49, the line memory 37 and the computing circuit 38 will be described. When the sampling is T, according to the sampling theorem, the time function I(t) of the original video signal can be expressed as:

$$I(t) = \sum_{k=-\infty}^{\infty} I(kT) \frac{\sin\pi(t/T - k)}{\pi(t/T - k)}$$

From the above expression, the time function I($\Delta$t) of time $\Delta$t can be expressed as follows:

$$I(\Delta t) = \ldots + I(-2T)\frac{\sin\pi(\Delta t/T + 2)}{\pi(\Delta t/T + 2)} +$$

$$I(-T)\frac{\sin\pi(\Delta t/T + 1)}{\pi(\Delta t/T + 1)} + I(0)\frac{\sin\pi(\Delta t/T)}{\pi(\Delta t/T)} +$$

$$I(T)\frac{\sin\pi(\Delta t/T - 1)}{\pi(\Delta t/T - 1)} + I(2T)\frac{\sin\pi(\Delta t/T - 2)}{\pi(\Delta t/T - 2)} + \ldots$$

Figure 3:
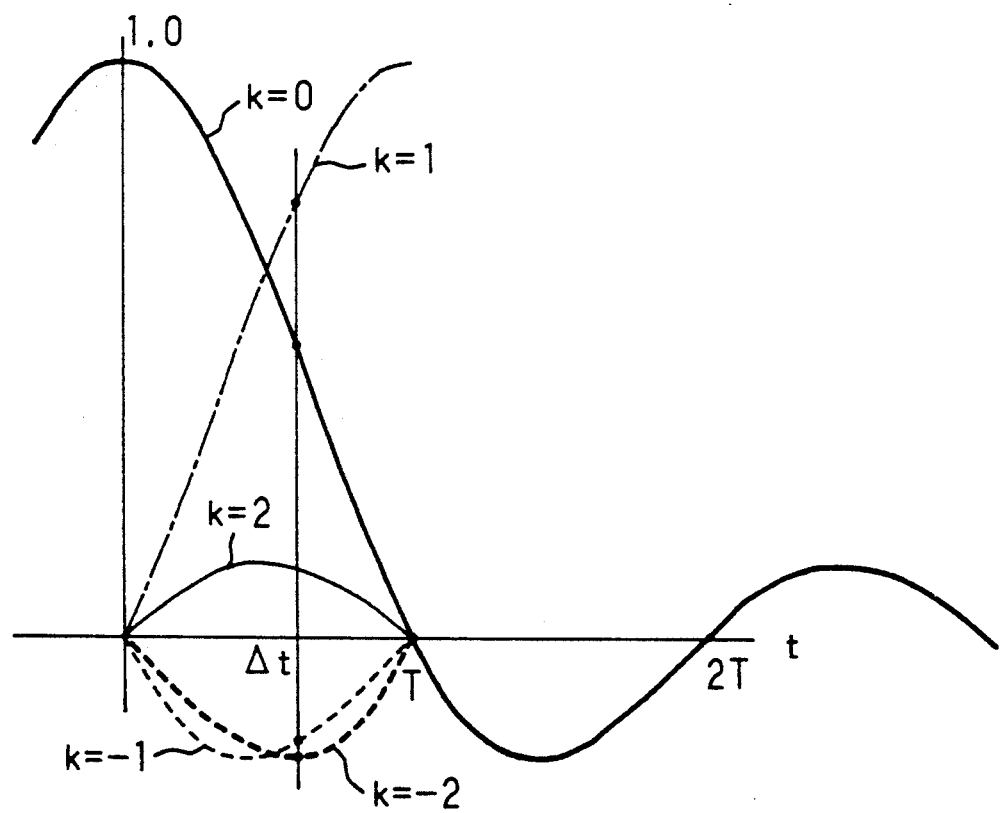
FIG. 3 is a graph showing the characteristics of coefficient data for interpolation.

FIG. 3 shows terms of a sampling function of time $\Delta$t in the sampling period T obtained by approximating the time function I($\Delta$t) with an approximation expression having five k values (i.e., k = −2, −1, 0, 1 and 2). In this embodiment, the interpolation along the vertical direction is carried out by using this approximation expression. Namely, in the computed data generation circuit 49, the time difference $\Delta$t between the pulse $P_V$ and the vertical synchronizing signal V is obtained, and values respectively corresponding to those of k shown in FIG. 3 are obtained from this time difference $\Delta$t and supplied to the computing circuit 38. In the computing circuit 38, interpolation video data are computed on the basis of these values and actual data for five lines of I(−2T), I(−T), I(0), I(T) and I(2T) which are stored in the line memory 37.

The obtained interpolation video data are temporarily stored in the data latch circuit 39 until the timing of writing data into the video memory 40 occurs.

In accordance with the memory write addresses from the memory write control circuit 50, the data stored in the data latch circuit 39 are written into the video memory 40 during the idle period of the memory read control circuit 51.

In order to assure that the brightness control for all of the M×N display elements is carried out during the vertical display period $T_V$ of the input video signal, the memory read control circuit 51 performs the driving process line by line. The gradation control of the luminous strength is done by controlling the period and the lighting number of each display element. For example, the gradation of 1-bit weight can be achieved by switching one line on and off one time during the vertical display period $T_V$. The M number of data for the line selected once in the period of $T_V/N$ are read out from the video memory 40, and the read out data are compared with the 1-bit weight data set in the comparison circuit 42. Then, the M number of data (one bit) indicative of lighting or non-lighting are temporarily stored in the data latch circuit 43.

After the process of storing the data, the memory read control circuit 51 supplies the driving trigger pulse to the driving signal generation circuit 52 which in turn supplies the driving voltage required for lighting to the line driving circuit 45 and the column driving circuit 44. This operation is conducted one time for every N lines during the vertical display period $T_V$.

The above-described embodiment is configured so as to process monochrome video signals. When color video signals are to be processed, the circuitry from the impedance matching circuit 33 to the column driving circuit 44 is constructed in triplex.

In the embodiment, the interpolation computing is performed on the basis of data of five continuous lines. According to the invention, the interpolation computing may be performed on the basis of data obtained in another system, for example, data of two lines.

The display elements used in the embodiment are of the luminous type, and driven by controlling their driving period or number. When the present invention is applied to a display apparatus having display elements of the intensity modulation type, the display elements are driven by another driven system.

As seen from the above description, according to the present invention, the frequency band is limited on the basis of the screen display period of a signal selected by switching a plurality of video signals and the number of the display elements, and the interpolation computing along the vertical direction is performed. In the display apparatus of the invention, therefore, the abilities of a screen can be exhibited fully, thereby allowing different kinds of video signals to be reproduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A display apparatus which is provided with a screen having a plurality of display elements arranged in a matrix form and in which images are displayed on said screen by controlling the brightness of the display elements, comprising:
    means for inputting an analog video signal;
    band limitation means for limiting the input video signal to a frequency bandwidth equal to or narrower than half of a frequency band which is calculated on the basis of the number of display elements along the horizontal direction of said screen;
    signal generation means for generating a sampling signal which is synchronized with a synchronizing signal of the input video signal;
    means for converting the input analog video signal to digital video data in synchronism with the sampling signal;
    storage means for storing the converted video data;
    computing means for computing vertical interpolation video data on the basis of the stored video data; and
    means for controlling the brightness of the display elements on the basis of the computed interpolation video data.

2. A display apparatus according to claim 1, wherein said computing means computes the interpolation video data on the basis of video data of continuous five lines stored in said storage means.

3. A display apparatus according to claim 1, wherein said computing means computes the interpolation video data so as to perform the interpolation of the difference between the number of display elements along the vertical direction of said screen and the number of the scanning lines along the vertical direction in the input video signal.

4. A display apparatus according to claim 1, wherein said band limitation means limits the input video signal to the frequency band width equal to or narrower than the half of a frequency band of $M/T_H$ where M is the number of display elements along the horizontal direction of said screen and $T_H$ is the horizontal display period for said screen.

5. A display apparatus according to claim 1, wherein said signal generation means generates a sampling signal of frequency of $M/T_H$ where M is the number of display elements along the horizontal direction of said screen and $T_H$ is the horizontal display period for said screen.

6. A display apparatus according to claim 1, wherein said signal generation means generates a pulse of frequency of $N/T_V$ where N is the number of display elements along the vertical direction of said screen and $T_V$ is the vertical display period for said screen.

7. A display apparatus according to claim 6, wherein said computing means computes the interpolation video data corresponding to a time difference between said pulse and the vertical synchronizing signal of input video signal.

8. A display apparatus according to claim 1, further comprising second storage means for storing the vertical interpolation video data computed by said computing means.

9. A display apparatus which is provided with a screen having a plurality of display elements arranged in a matrix form and in which images are displayed on said screen by controlling the brightness of the display elements, comprising:
    means for inputting a plurality of analog video signals which are different in kind;
    means for selecting one of the plurality of input video signals;
    band limitation means for limiting the selected input video signal to a frequency bandwidth equal to or narrower than half of a frequency band which is calculated on the basis of the number of display elements along the horizontal direction of said screen;
    signal generation means for generating a sampling signal which is synchronized with the synchronizing signal of the selected video signal;
    means for converting the selected analog video signal to digital video data in synchronism with the sampling signal;
    storage means for storing the converted video data;
    computing means for computing vertical interpolation video data on the basis of the stored video data; and
    means for controlling the brightness of the display elements on the basis of the computed interpolation video data.

10. A display apparatus according to claim 9, wherein said computing means computes the interpolation video data on the basis of video data of continuous five lines stored in said storage means.

11. A display apparatus according to claim 9, wherein said computing means computes the interpolation video data so as to perform the interpolation of the difference between the number of display elements along the vertical direction of said screen and the number of the scanning lines along the vertical direction in the input video signal.

12. A display apparatus according to claim 9, wherein said band limitation means limits the input video signal to a frequency bandwidth equal to or narrower than half of a frequency band of $M/T_H$ where M is the number of display elements along the horizontal direction of said screen and $T_H$ is the horizontal display period for said screen.

13. A display apparatus according to claim 9, wherein said signal generation means generates a sampling signal of frequency of $M/T_H$ where M is the number of display elements along the horizontal direction of said screen and $T_H$ is the horizontal display period for said screen.

14. A display apparatus according to claim 9, wherein said signal generation means generates a pulse of frequency of $N/T_V$ where N is the number of display elements along the vertical direction of said screen and $T_V$ is the vertical display period for said screen.

15. A display apparatus according to claim 14, wherein said computing means computes the interpolation video data corresponding to a time difference between said pulse and the vertical synchronizing signal of input video signal.

16. A display apparatus according to claim 9, further comprising second storage means for storing the vertical interpolation video data computed by said computing means.

* * * * *